(12) United States Patent
Sasanuma et al.

(10) Patent No.: US 7,609,909 B2
(45) Date of Patent: Oct. 27, 2009

(54) IMAGE DENSITY TEST CHART AND METHOD FOR DETERMINING IMAGE DENSITY LEVEL

(75) Inventors: Nobuatsu Sasanuma, Abiko (JP); Makoto Yoshihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 613 days.

(21) Appl. No.: 10/704,680

(22) Filed: Nov. 12, 2003

(65) Prior Publication Data

US 2004/0141195 A1 Jul. 22, 2004

(30) Foreign Application Priority Data

Nov. 12, 2002 (JP) .............................. 2002-328364

(51) Int. Cl.
 G06K 9/00 (2006.01)
 G06K 9/40 (2006.01)
 G03F 3/08 (2006.01)
 G06F 15/00 (2006.01)
 G06K 1/00 (2006.01)

(52) U.S. Cl. ........................ 382/274; 382/162; 358/521; 358/1.9

(58) Field of Classification Search ................. 382/274, 382/162; 358/521, 1.9
 See application file for complete search history.

(56) References Cited

U.S. PATENT DOCUMENTS

| | | | |
|---|---|---|---|
| 4,166,701 A * | 9/1979 | Miller .................... 356/404 |
| 4,687,334 A | 8/1987 | Miyakawa ................ 356/404 |
| 5,598,272 A | 1/1997 | Fisch et al. ................ 358/298 |
| 5,917,511 A * | 6/1999 | Ueda ........................... 347/19 |
| 5,953,990 A | 9/1999 | Chalmers et al. ........... 101/211 |
| 6,091,512 A | 7/2000 | Sasanuma et al. ........... 358/1.9 |
| 6,139,325 A * | 10/2000 | Tracy et al. ................ 434/104 |
| 6,628,426 B2 * | 9/2003 | Denton et al. ............... 358/1.9 |
| 6,672,701 B1 * | 1/2004 | Nunokawa ................... 347/19 |
| 6,715,417 B2 * | 4/2004 | Okuda ........................ 101/181 |
| 2002/0030832 A1 * | 3/2002 | Shibuya et al. ............. 358/1.9 |
| 2004/0095591 A1 * | 5/2004 | Takahashi ................... 358/1.9 |
| 2005/0190386 A1 * | 9/2005 | Zaima ........................ 358/1.9 |

FOREIGN PATENT DOCUMENTS

| JP | 60-220659 | 11/1985 |
|---|---|---|
| JP | 1-138458 | 5/1989 |
| JP | 3-69272 | 3/1991 |
| JP | 2000-122367 | 4/2000 |
| JP | 2000-346707 | 12/2000 |
| JP | 2004072620 A * | 3/2004 |

* cited by examiner

*Primary Examiner*—Bhavesh M Mehta
*Assistant Examiner*—Bernard Krasnic
(74) *Attorney, Agent, or Firm*—Fitzpatrick, Cella, Harper & Scinto

(57) ABSTRACT

An image density discrimination chart is used to discriminate a density of a test image printed by an image forming apparatus. The chart includes an exposing portion for exposing the test image when the chart is overlaid relative to a printed recording material, a first comparison image having an upper limit level of a latitude, permitted by the image forming apparatus, for image density of the test image, and a second comparison image having a lower limit level of a latitude, permitted by the image forming apparatus, for image density of the test image.

1 Claim, 9 Drawing Sheets

DENSITY DISCRIMINATION CHART

DENSITY CHART

IMAGE DENSITY TEST CHART AND METHOD FOR DETERMINING IMAGE DENSITY LEVEL

FIELD OF THE INVENTION AND RELATED ART

The present invention relates to a chart for determining the image density level at which an image forming apparatus outputs an image, and a method for determining the image density level of an image forming apparatus. In particular, it relates to a chart and a method, which make it easier to determine the image density level at which an image forming apparatus outputs an image.

Japanese Laid-open Patent Application 3-69272 discloses one of the charts for determining the image density level at which an image forming apparatus outputs an image, and one of the methods for determining the image density level at which an image forming apparatus outputs an image, which are as follows:

The chart for determining the image density level of an image forming apparatus (which hereinafter will be referred to as density test chart) has a patch (area) with a referential density, and a window (hole) located next to the patch. In order to determine the image density level at which an image forming apparatus outputs an image, an image of a density test pattern is to be printed out by the image forming apparatus. This density test pattern has multiple patches (areas), which are different in density level and are arranged in the order of density level.

In order to determine the image density level of a printed sample image of a given patch of the image density test pattern, the image density test chart is placed on the printed sample image of the image density test pattern so that the printed sample image of the given patch of the image density test pattern can be seen through the window (hole) of the image density test chart. Then, one of the patches of the printed sample image of the image density test pattern, which is the same in image density level as the comparative patch with the referential image density level, is to be visually spotted.

The above described density test chart has a large number of patches with which the printed sample image of the image density test pattern is to be compared in density, making it easier to reduce the number of errors (deviation) which occur, due to the differences in visual sense among the testers, when finding one of the patches of the printed sample image of the image density test pattern, which is the same in image density as the image density test chart (referential chart).

However, the above described combination of the image density test chart, density test pattern, and method, requires a substantial length of time to find one of the patches of the printed sample image of the image density test pattern, which is the same in density as the referential density, creating the problem that the image density level at which an image forming apparatus outputs an image cannot be easily determined.

SUMMARY OF THE INVENTION

Thus, the primary object of the present invention is to provide a combination of an image density test chart and a method for determining the image density level at which an image forming apparatus outputs an image.

According to an aspect of the present invention, there is provided an image density discrimination chart for discrimination of a density of an image, usable with an image forming apparatus, said image density discriminating chart comprising an exposure portion for being overlapped on an image density discrimination pattern printed on a recording material, and exposing an image density discrimination pattern; and a plurality of comparison patterns which have densities different from each other, disposed around said exposure portion, which is to be compared with the image density discrimination pattern exposed through said exposure portion.

According to another aspect of the present invention, there is provided a method of discriminating a density of an image formed by an image forming apparatus, said method includes a printing step of printing an image density discrimination pattern by the image forming apparatus; a step of overlaping an image density discrimination chart having an exposure portion on the image density discrimination pattern and exposing the image density discrimination pattern through the exposure portion; and a step of comparing an image density of the image density discrimination pattern exposed through said exposure portion and an image density of a plurality of image density discrimination patterns having different image densities and provided at the exposure portion.

These and other objects, features, and advantages of the present invention will become more apparent upon consideration of the following description of the preferred embodiments of the present invention, taken in conjunction with the accompanying drawings.

DETAILED DESCRIPTION OF THE PREFERRED EMBODIMENTS

Figure 1:
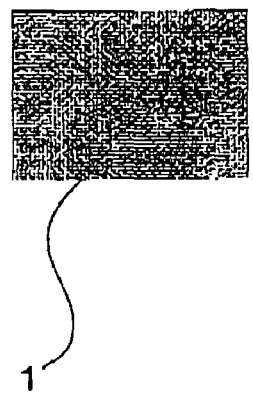
FIG. 1 is a drawing of an example of an image density test sheet having an image density test pattern.

Hereinafter, the chart for determining the image density (which hereinafter will be referred to as image density test chart), and the method for determining the image density (which hereinafter will be referred to image density testing method), in this embodiment of the present invention, will be described. FIG. 1 is a drawing of an image of the image density test pattern in this embodiment, which was printed on a piece of recording paper, and FIG. 2 is a drawing of the image density test chart in this embodiment.

Described next are the combination of the image density test chart for determining the image density level at which an image forming apparatus outputs an image, and the method for determining the image density level of an image forming apparatus with the use of the chart.

First, referring to FIG. 1, an image of the image density test pattern 1 is to be printed with the use of a given image forming apparatus.

Figure 2:
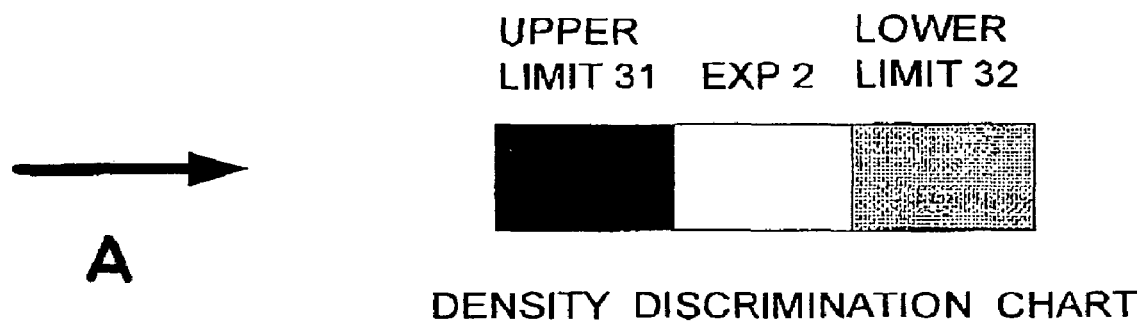
FIG. 2 is a drawing of the image density test chart in one of the embodiments of with the present invention.

The image density test chart shown in FIG. 2 is provided with a window (hole) 2, which is aligned with the above described printed sample image of the image density test pattern. The test chart is also provided with comparative patches (areas) 3 (31 and 32), with which the image of the image density test pattern printed by the image forming apparatus is compared in terms of image density. The comparative patches 31 and 32 have the upper limit density level, and lower limit density level, respectively, and are positioned in contact with the blank area 2, in a manner to sandwich the window 2 from the left and right side, respectively.

In order to determine the image density level of the printed sample image of the image density test pattern 1, it is visually examined whether or not the image density level of the printed sample image of the image density test pattern 1 is between the upper and lower image density level limits.

Human visual sense is not particularly reliable in determining whether or not two patches (areas) which are identical in color and are uniform in image density, are identical in image density level, but it easily detects the difference in image density level between two monochromatic patches (areas) which are identical in color and are uniform in image density. Therefore, the image density of an image outputted by an image forming apparatus can be easily determined by the above described combination of the chart and method for determining the image density.

Placing in a straight line the window (hole) 2 and two comparative patches 31 and 32 of the image density test chart is effective to accurately determine the image density level of the image visible through the window.

Figure 3:
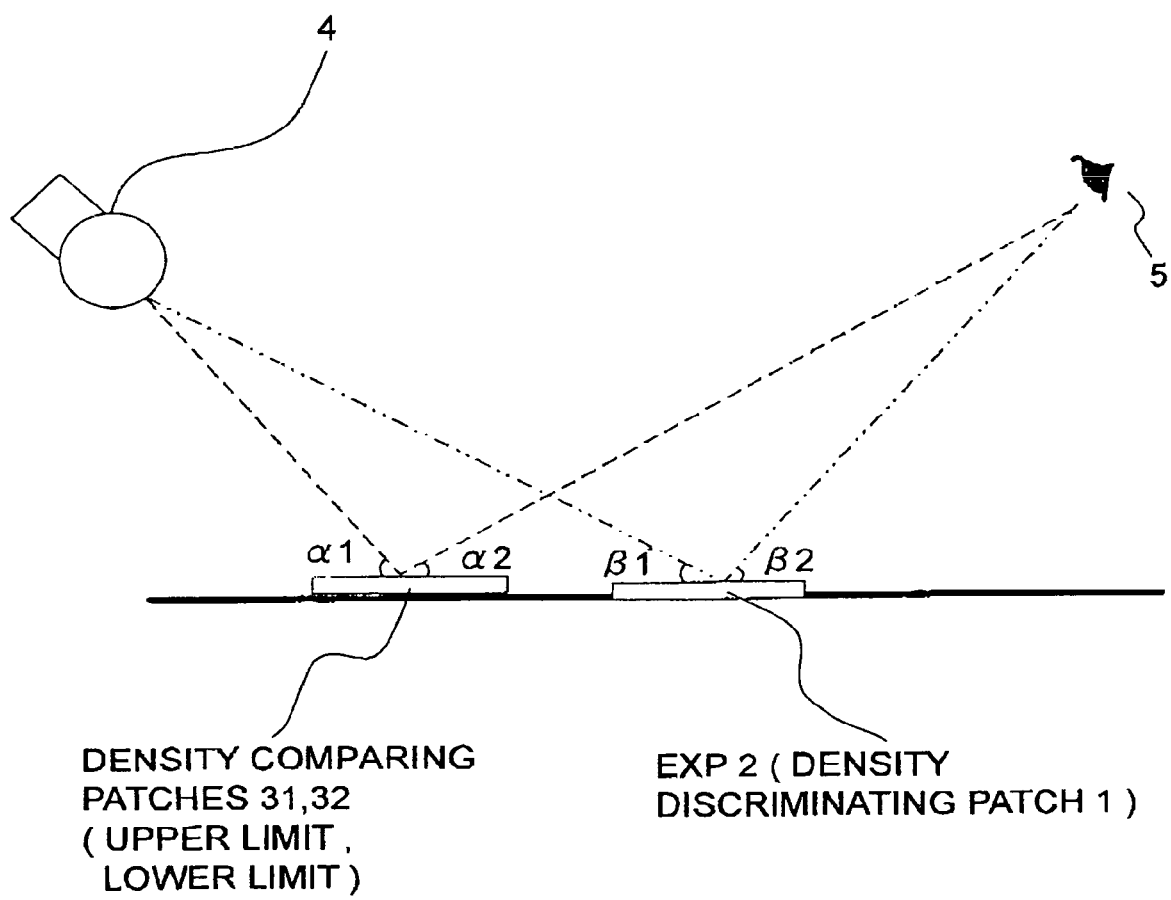
FIGS. 3, 4, and 5 are drawings for describing the effect of the placement, in a straight line, of the window (hole) of the image density test chart in accordance with the present invention, and the comparative patches.
Figure 4:
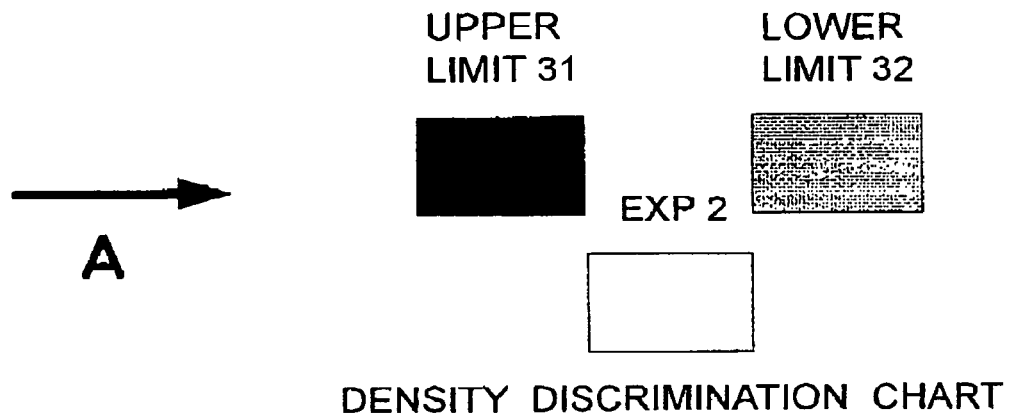

FIG. 3 is a drawing which shows how the positional relationship, shown in FIG. 4, in which the window 2 and comparative patches 31 and 32 of the image density test chart are not positioned in a straight line, looks when the image density chart in FIG. 4 is seen from the direction A shown in FIG. 4. In the case of the image density test chart in FIG. 3, the image density test chart is placed on the printed sample image of the image density test pattern, so that the window 2 of the test chart overlaps with the printed sample image of the image density test pattern 1.

Referring to FIG. 3, the light from a light source 4 is reflected toward an eye 5 by the printed sample image of the image density test pattern 1, which is exposed (visible) through the window 2, and the comparative patches 31 and 32, and the light reflected therefrom are detected by the eye 5, which is capable of discerning the difference in image density between the printed sample image of the density detection pattern 1 and comparative patches 3.

In FIG. 3, $\alpha 1$ stands for the angle at which the light from the light source 4 hits a given point of the comparative patch 31, and $\alpha 2$ stands for the angle at which the light is reflected toward the eye 5 by the given point of the comparative patch 31, and the given point of the comparative patch 32. $\beta 1$ stands for the angle at which the light from the light source 4 hits a given point of the printed sample image of the image density test pattern 1 exposed through the window 2, and $\beta 2$ stands for the angle at which the light is reflected toward the eye 5 by the given point of the printed sample image of the image density test pattern 1; $\alpha 1 \neq \beta 1$, and $\alpha 2 \neq \beta 2$. If these angles are different, the amount of the light by which the light from the light source 4 reaches the eye 5 differs even if the comparative patches are identical in image density to the printed sample image of the image density test pattern 1, and therefore, the human visual sense fails to accurately determine that the comparative patches are identical in image density to the printed sample image of the image density test pattern 1; in other words, the image density of the printed sample image of the image density test pattern 1 cannot be accurately determined.

Figure 5:
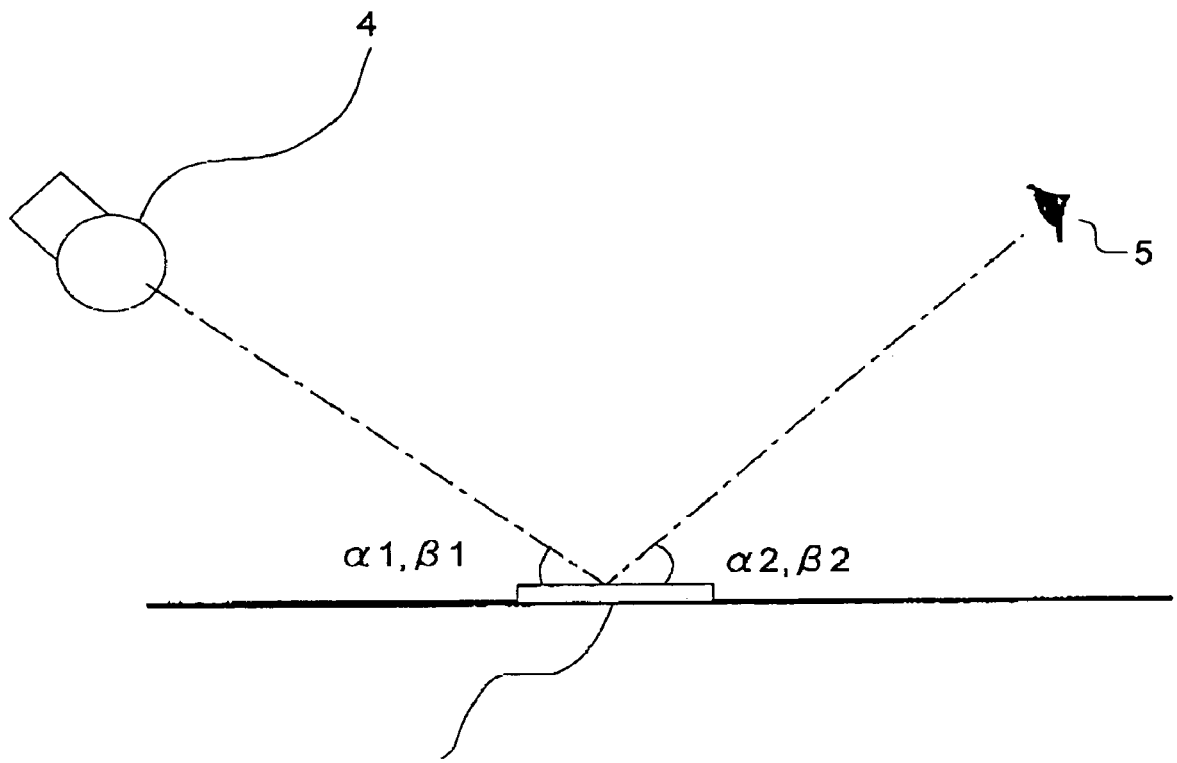

In comparison, when the image density test chart is configured so that the window 2 is positioned virtually in a straight line with the comparative patches (31 and 32) as shown in FIG. 2, $\alpha 1 = \beta 1$, and $\alpha 2 = \beta 2$, as shown in FIG. 5. In other words, the window 2 (printed sample image of image density test pattern 1) and the comparative patches are identical in the amount by which the light source 4 reaches them, making it possible to accurately determine the difference in image density between the comparative patches 3 and the printed sample image of the image density test pattern 1, that is, making it possible to accurately determine the image density level of the printed sample image of the image density test pattern 1.

Further, placing the comparative patches 3 immediately next to the window 2 makes it possible to more accurately determine the image density level of the printed sample image of the image density test pattern 1 than otherwise, for the following reason. That is, when the comparative patches 3 are not immediately next to the window 2, the sheet (substrate) on which the image density test chart is printed, and which is different in density from the comparative patches 3 and the printed sample image of the image density test pattern 1, is visible from between the comparative patches 3 and window 2. Therefore, the human visual sense is affected by the image density of this visible portion of the substrate of the image density test chart; in other words, it becomes difficult to detect the difference in image density level between the comparative patches 3 and the printed sample image of the image density test pattern. This is why the comparative patch 3 is to be placed immediately next to the window 2, that is, without the presence of a gap between the comparative patch 3 and the window 2.

Figure 6:
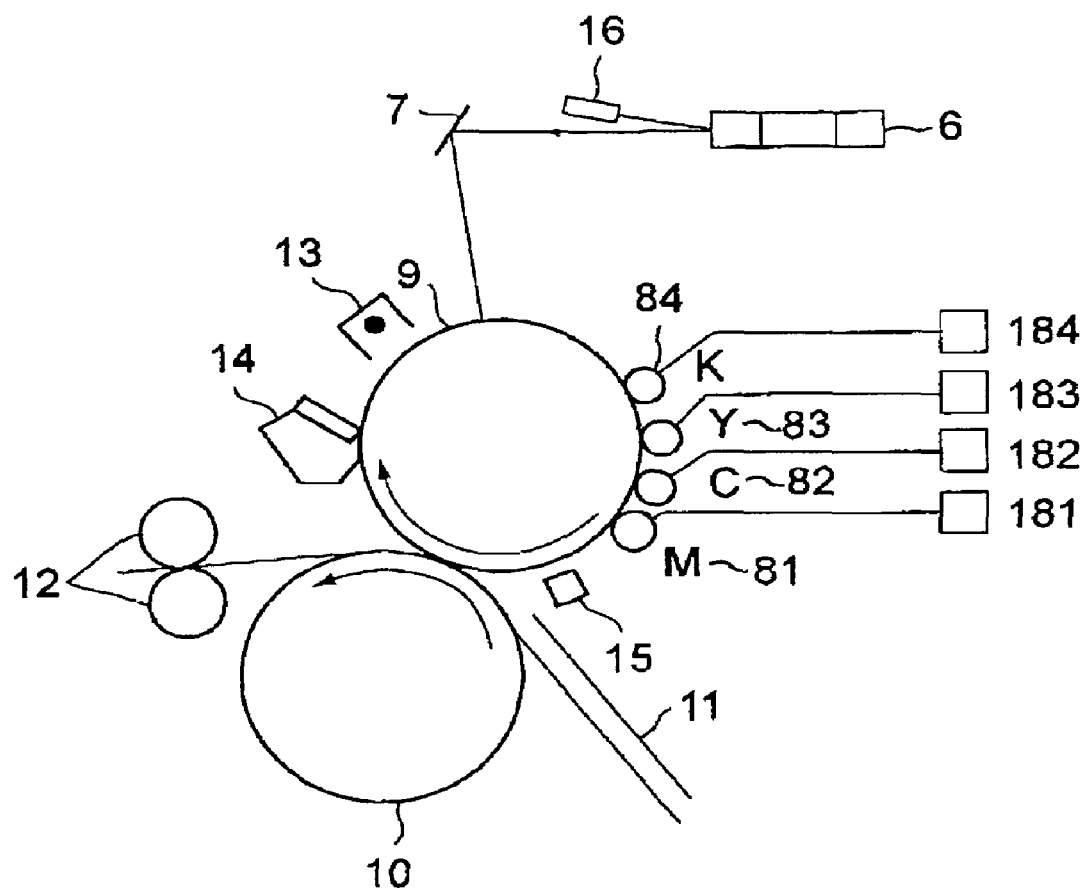
FIG. 6 is a schematic sectional view of an example of the image forming apparatus compatible with the image density test chart in accordance with the present invention.

At this time, an example of an image forming apparatus adjustable in image density will be described with reference to the image density test chart in accordance with the present invention. The image forming apparatus, which will be described next, is a color image forming apparatus having four developing devices different in development color: M (magenta) developing device 81, C (cyan) developing device 82, Y (yellow) developing device 83, and Bk (black) developing device 84. Referring to FIG. 6, the image signals for magenta color, or the first color, are converted into a beam of laser light by a laser driver and a laser light source (neither of which are shown), and the beam of laser light is reflected by a polygon mirror 6 and a mirror 7, being thereby projected upon a photoconductive drum 9, which has been electrically charged in advance by a charging device 13. As the photoconductive drum 9 is scanned by the beam of laser light, an electrostatic latent image is formed on the photoconductive drum 9, which is being rotated in the direction indicated by an arrow mark in the drawing. A cleaner 14 and a detector 15 are also part of the image forming apparatus. Then, voltage is applied to the M (magenta) developing device 81 from a magenta developing power source 181. Developing power sources 182, 183 and 184 for the cyan, yellow and black developing devices are similarly provided. As a result, the electrostatic latent image is developed into a visible image formed of toner, or a toner image.

A recording paper 11 is placed in contact with a transfer drum 10, partially wrapping around the transfer drum 10. The visible image formed of the toner of the first color, that is, magenta, on the photoconductive drum 9, is transferred by an unshown transferring means onto the recording paper 11 wrapped around the transfer drum 10.

Similarly, the toner images formed on the photoconductive drum 9 by the image signals for C (cyan), Y (yellow), and Bk (black) color components are sequentially transferred onto the recording paper 11. Then, the recording paper 11 onto which the four toner images different in color have just been transferred is separated from the transfer roller 10, and is conveyed to a fixing device 12. The fixing device 12 fixes the toner images on the recording paper 11; it produces permanent images.

Next, another (second) embodiment of the present invention will be described in detail.

Figure 7:
FIG. 7 is a drawing of the image density test chart in another embodiment of the present invention.

FIG. 7 is the density test chart in the second embodiment of the present invention.

An image forming apparatus adjustable in density with the use of the density test chart in this embodiment is such an image forming apparatus that is capable of out putting an image having areas, the image density level of which is in the middle (halftone) range, as well as areas, the image density level of which is in the highlight range.

This density test chart is printed in advance using multiple printing inks identical in color (inclusive of hue, saturation, and lightness) to the color components, one for one, on which a color image forming apparatus is based.

Further, this density test chart is provided with multiple sets of comparative patches 3, one set for each color component, which were printed in advance, and with which the images of the image density test pattern printed at the maximum image density level by the full-color image forming apparatus shown in FIG. 6 are compared in image density.

More concretely, a pair of comparative patches 3, which represent, one for one, the lower limit and upper limit permissible as the operational density of the image forming apparatus, are printed for each color component. It had been assured with the use of a properly calibrated density meter that the comparative patches 3 of the image density test pattern are accurate in image density.

Letters K, Y, M, and C on the density test chart represent black, yellow, magenta, and cyan colors, respectively.

Next, the sequence for testing a full-color image forming apparatus in terms of the image density level at which the apparatus outputs an image, will be described.

1) An image of the image density test pattern 3 (16 levels of gradation) is outputted on a piece of paper as recording medium, with the use of a given full-color image forming apparatus.

Figure 8:
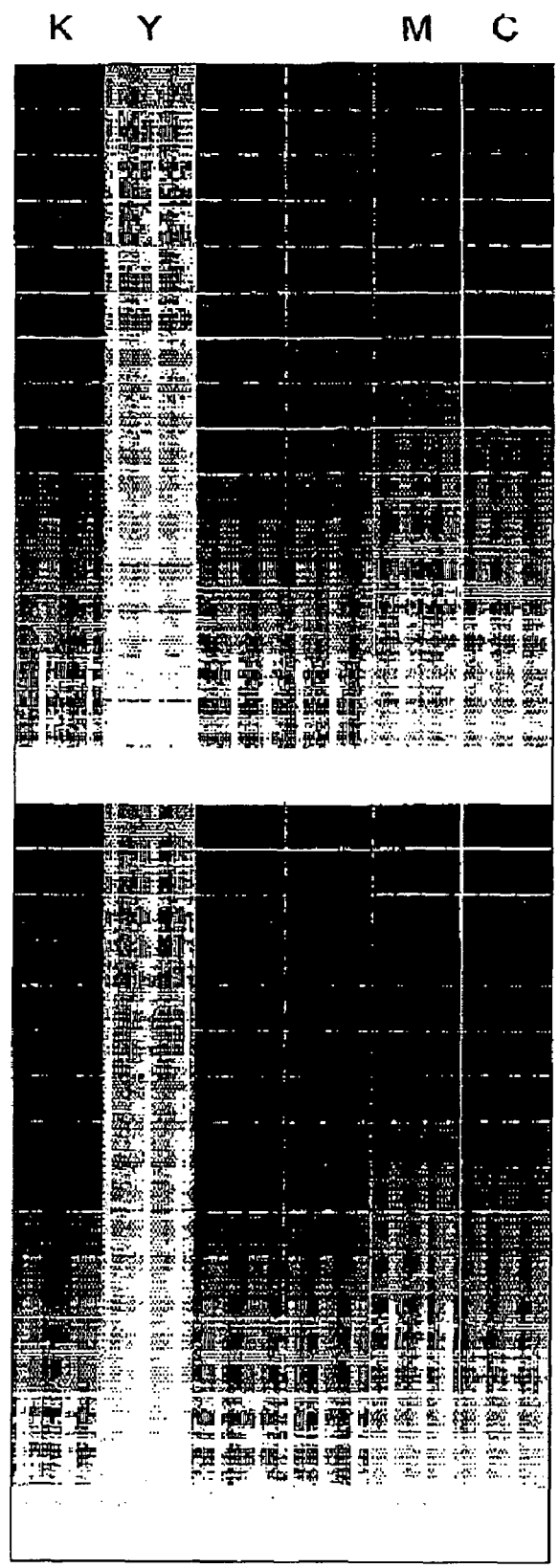
FIG. 8 is a drawing of the image density test pattern in another embodiment of the present invention.

FIG. 8 shows the outputted images of the image density test pattern 3.

In this image density test pattern 3, the column represents hue (K, Y, M, or C), and the row represents the gradation level. In each column, the comparative patches are arranged in the order of the image density level expressed in binary code, using eight bits: 16, 32, 48, 64, 80, 96, 112, 128, 144, 160, 176, 192, 208, 224, 240, and 255.

2) The image density test chart is to be placed on the recording paper, on which the image of the image density test pattern 3 was printed, to align the test chart and recording paper so that the darkest patch (patch with maximum density Dmax) can be seen through the window 2 (or "recess" G formed by cutting off a part of edge portion of sheet on which image density test chart was printed). Then, the printed sample image of the image density test pattern 3 is to be compared in density with the three comparative patches 3 positioned on the top, left, and right sides, one for one of the window 2. The comparative patches 3 of this image density test chart are positioned so that the comparative patch highest in density is placed on the left side of the window 2; the comparative patch middle in density (halftone patch) is on the top side of the window 2; and the comparative patch lowest in density is on the right side of the window 2. In other words, in this image density test chart, density reduces in the clockwise direction, making it easier for a user or a service person to recognize the difference in density between each comparative patch 3 and the printed sample image of the image density test pattern 1. Incidentally, even if the comparative patches 3 are positioned so that the patch with the lowest density is positioned on the left side of the window 2; the patch with the middle density (halftone patch) is positioned on the top side of the window 2, and the patch with the highest density is positioned on the right side of the window 2, the image density test chart will work just as well as the image density test chart in this embodiment. In terms of size, the window 2 and comparative patches 3 are made roughly the same, improving thereby the accuracy with which the image density level is determined, because, when two areas identical in image density, but different in size, are compared, the area with the larger size appears greater in image density. It is possible that the recording sheet having the printed sample image of the image density test pattern 1 will not be perfectly aligned with the image density test chart. Therefore, the printed sample image of the image density test pattern 1 is desired to be slightly larger than the window 2 of the image density test chart. In other words, the printed sample image of the image density test pattern 1 is desired to be large enough to block the entirety of the window 2 of the image density test chart, even if the printed sample image of the image density test pattern 1 does not perfectly align with the window 2 of the image density test chart.

3) It is determined whether or not the image density level of the image of the image density test pattern 1 printed in each color (Y, M, C, or K) at the highest density level Dmax, is between the upper limit and lower limit.

With the image density test chart and density test pattern 1 configured as described above, it is possible to quickly determine whether or not the image density level of the printed sample image of the image density test pattern 1 is within the predetermined range, or is close, or identical, to the image density level of any of the comparative patches 3.

Further, by strictly comparing the image density level of the image of the image density test pattern 1 printed by the image forming apparatus, with the target density level, the image forming apparatus can be adjusted in image formation condition so that the image formation condition of the image forming apparatus becomes much closer to the normal image formation condition.

Next, the image density level of the printed sample image of the image density test pattern 1 is tested with the use of an image density test chart for the middle (halftone) range having a window (hole) and comparative patches with upper, target, and lower density level limits, one for one, and an image density test chart having a window (hole) and comparative patches with upper, target, and lower density level limits, one for one.

As will be evident from the above description of this embodiment of the present invention, with the use of the above described image density test chart and image density testing method, an image forming apparatus can be quickly tested in image density level, in the maximum, medium, and highlight range, with the use of simple image density test charts, that is, image density test charts with a window.

Next, the operation of an image forming apparatus adjustable in image density with the use of the image density test charts in this embodiment, and the sequence for adjusting the image forming apparatus in terms of image density after the determination of the image density level of the image forming apparatus, will be described.

Although the operation, and adjustment, in image density level, of the image forming apparatus in this embodiment will be described with reference to FIG. 6, the components, members, etc., of the apparatus similar in function to those of the image forming apparatus in the preceding embodiments of the present invention will be not described here.

The image signals are converted into a beam of laser light by a laser driver and a laser light source (neither of which are shown), and the beam of laser light is reflected by a polygon mirror 6 and a mirror 7, being thereby projected upon a photoconductive drum 9. As the photoconductive drum 9 is scanned by the beam of laser light, an electrostatic latent image is formed on the photoconductive drum 9, which is being rotated in the direction indicated by an arrow mark in the drawing.

Meanwhile, the transfer paper 11 is wrapped around the transfer drum 10, and is rotated with the transfer drum 10, once for each of the color components M (magenta), C (cyan), Y (yellow), and Bk (black), in the listed order. In other words, the transfer process ends as the transfer paper 11 is rotated four times, while remaining wrapped around the transfer drum 10.

As soon as the transfer process ends, the transfer paper 11 is separated from the transfer drum 10, and the toner images on the recording paper 11 are fixed to the transfer paper 11 by a pair of fixation rollers 12, yielding thereby a color print.

Figure 9:
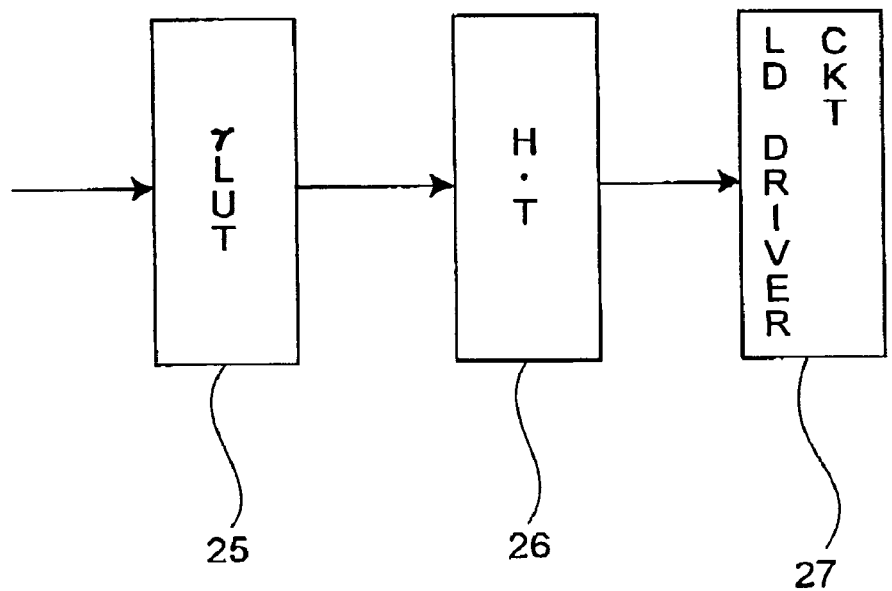
FIG. 9 is a block diagram for showing the method for controlling an image forming apparatus compatible with the image density test chart in accordance with the present invention, in terms of the image density in the middle (halftone) and highlight ranges.

FIG. 9 shows an image signal processing circuit, in this embodiment, for forming an image accurate in gradation.

An image signal is converted by LUT 25 so that the image density level of an image output by a given image forming apparatus matches the image density level, that is, the initially set &C& properties of the given image forming apparatus expressed in the form of an image formation signal. Then, it is sent through a circuit 26 for processing middle (halftone) range density, and then, to a laser driver circuit 27, to fire a beam of laser light for exposing a photoconductive drum.

Figure 10:
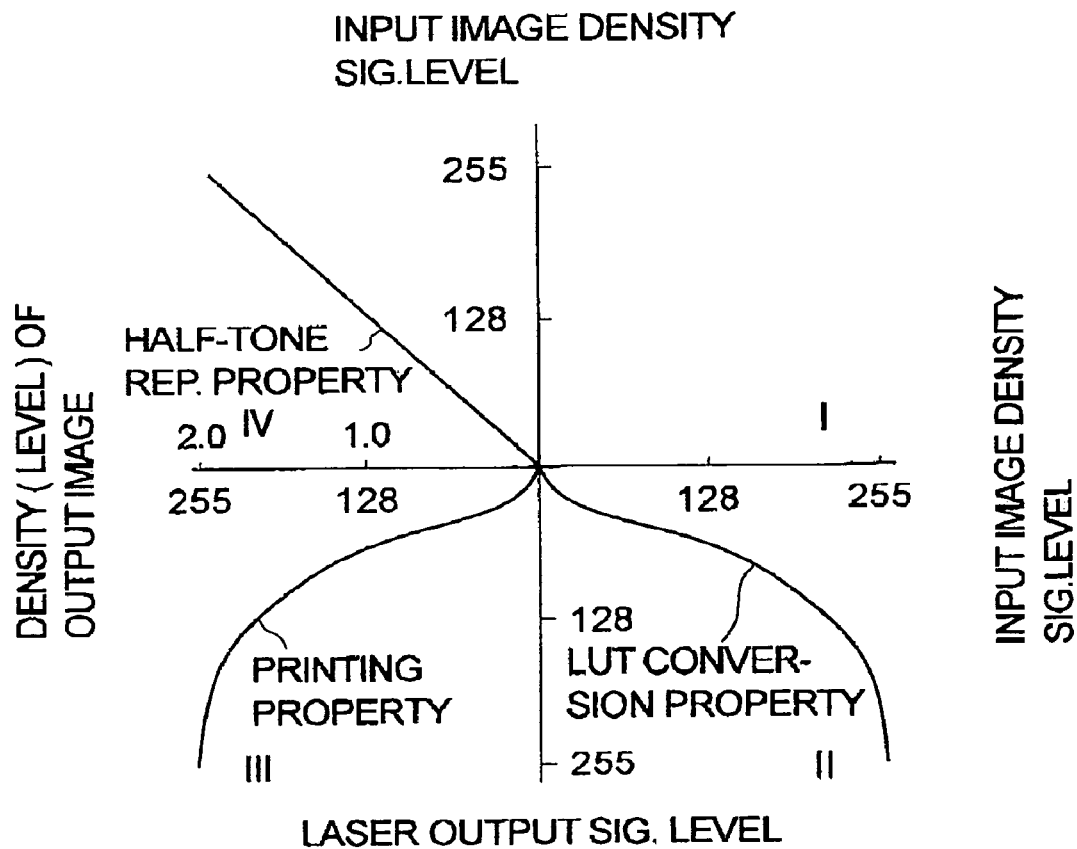
FIG. 10 is a drawing for showing how an image forming apparatus compatible with the image density test chart in accordance with the present invention is controlled, in terms of the image density in the middle (halftone) and highlight ranges.

FIG. 10 shows the four-quadrant chart which shows how gradation is reproduced.

The second quadrant shows the properties of the LUT 25 for converting an inputted image density signal into a laser firing signal, and the third quadrant shows the properties of an image forming apparatus which converts a laser firing signal into an image density level. The fourth quadrant shows the overall gradation properties of the image forming apparatus, that is, the relationship, in terms of image density level, between a density signal inputted into the image forming apparatus, and the image outputted by the image forming apparatus.

The number of bits assigned for gradation level is eight. Therefore, 256 levels of gradation can be expressed.

In order to make linear the gradation properties of the image forming apparatus in this embodiment, that is, the relationship (gradation properties) between the image density level provided by an image signal, and the image density level of the image outputted in response to the image signal, shown in the fourth quadrant, one of the properties of the image forming apparatus, which is represented in the curved line in third quadrant, are compensated for, that is, adjusted, by another property of the image forming apparatus, that is, one of the properties of the LUT 25 shown in the second quadrant.

The image density level at which an image is outputted by the above described image forming apparatus is adjusted in the following manner.

First, the image density test pattern is printed at the maximum density level Dmax, in each of the primary colors (color components), using the above described image forming apparatus, and the image density levels of the printed density test pattern are determined with the use of the image density level test pattern in this embodiment. When the density level of the image of the image density test pattern printed in a given primary color (color component) at the maximum density level Dmax is greater than the upper limit density level, the development bias to be applied to the developing device (81, 82, 83, or 84) corresponding to the given primary color is adjusted in order to raise the maximum density level Dmax. On the other hand, when the density level of the image of the image density test pattern printed in the given primary color (color component) at the maximum density level Dmax is less than the lower limit density level, the development bias to be applied to the developing device (81, 82, 83, or 84) corresponding to the given primary color is adjusted in order to raise the maximum density level Dmax. The development bias is manually adjusted with the use of an unshown development bias adjustment knob.

Next, the image density test pattern is printed at the middle (halftone) and highlight density levels, in each of the primary colors (color components), using the above described image forming apparatus, and the image density levels of the printed density test pattern are determined with the use of the image density level test chart in this embodiment. When the densities of the images of the image density test pattern printed in a given primary color (color component) at the middle (halftone) and highlight density levels are greater than the upper limit for the middle (halftone) and highlight density levels, or less than the lower limit for the middle (halftone) and highlight density levels, respectively, the LUT 25 is adjusted in order to rectify the image forming apparatus in terms of the density level in the middle (halftone) and highlight ranges.

The LUT 25 is manually adjusted with the use of another adjustment knob.

Next, referring to FIG. 11, another embodiment of the present invention will be described.

Figure 11:
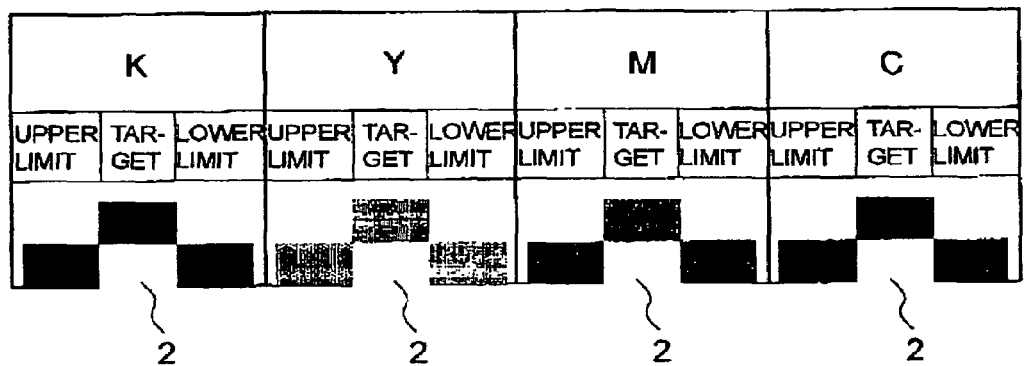
FIG. 11 is a drawing of the image density test chart in another embodiment of the present invention.

Referring to FIG. 11, in the case of the image density test chart in this embodiment, the windows 2, through which the printed sample images of the image density test pattern are to be seen, are at the bottom edge of the chart, as if they were made by cutting away four portions of the edge portion of the test chart, in a rectangular pattern.

Also in this embodiment, each set of the comparative patches 3 is positioned in a manner to frame the corresponding window 2 from the top side and both lateral sides.

Positioning the windows 2 of the image density test chart, through which the image density test pattern is to be seen, as they are in this embodiment, that is, along the bottom edge of the test chart, as if they were made by cutting away four portions of the edge portion of the test chart, in a rectangular pattern, makes it easier to align the printed sample images of the image density test pattern with the windows 2, one for one, making it thereby easier to determine the density level of the printed sample image of the image density test pattern.

Next, another embodiment of the present invention will be described.

The image density test chart in this embodiment is provided with a guiding line which coincides with the top edges of the windows 2 (top edges of upper limit patches and lower limit patches), making it thereby easier to make a sample image of the image density test pattern printed at the maximum density level Dmax by a full-color image forming apparatus accurately overlap with the window 2 of the image density test chart.

Figure 12:
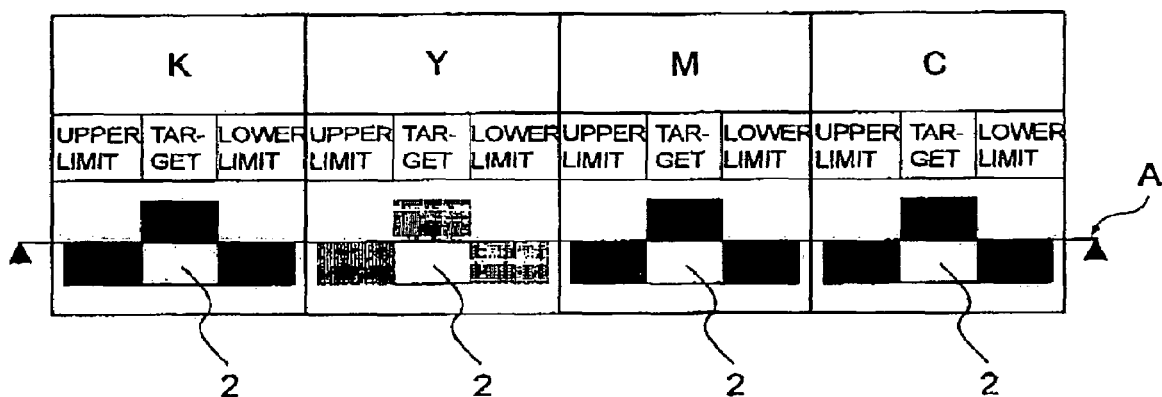
FIG. 12 is a drawing of the image density test chart in another embodiment of the present invention.
Figure 13:
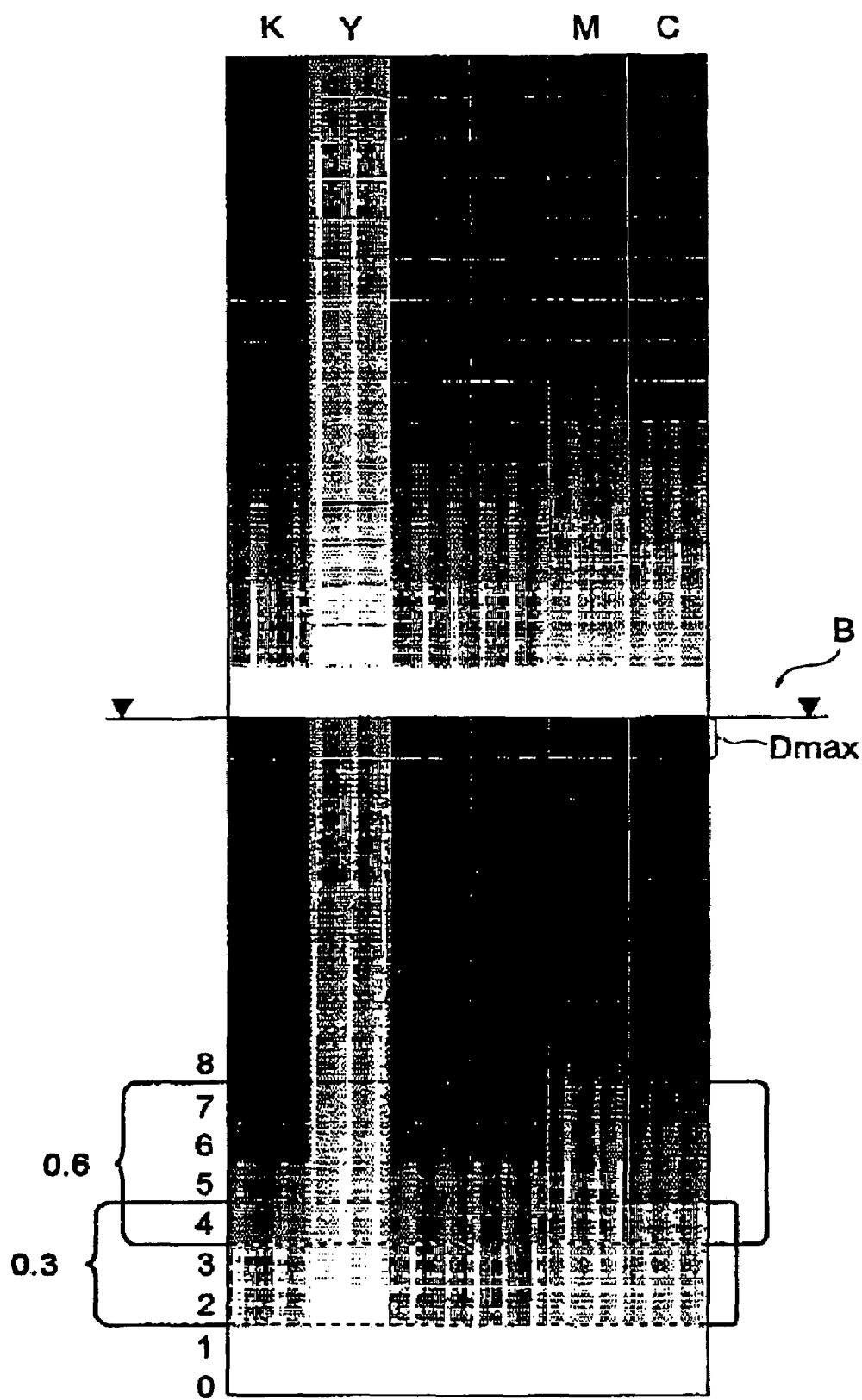
FIG. 13 is a drawing of the image density test pattern in another embodiment of the present invention.

FIG. 12 shows the image density test chart in this embodiment, and FIG. 13 shows the image density test pattern 1 in this embodiment.

Referring to FIG. 12, the image density test chart is provided with lines A, as guiding lines, usable for accurately positioning the test chart relative to a sample image of the image density test pattern. The lines A horizontally extend from the left and right edges of the image density test chart. On the other hand, when printing a sample image of the image density test pattern 1, the image forming apparatus is controlled so that lines B, as guiding lines, which are to be aligned with the lines A to accurately position the sample image of the test pattern 1 relative to the window 2, are printed along with the test pattern in a manner of extending from the left and right lateral edges of the printed sample image of the test pattern, one for one.

Therefore, by placing the image density test chart on the recording sheet having the sample image of the image density test pattern so that the lines A align with the lines B, one for one, the sample image of the image density test pattern to be tested for density can be quickly aligned with the window 2, to determine the image density level of the sample image of the image density test pattern; in other words, it is possible to reduce the time required for the image density level testing process.

In the case of some of the preceding embodiments of the present invention, by printing the four sample images of the image density test pattern so that each sample image accurately overlaps with the window 2 (window 22) of the corresponding density test chart, the image density levels of the four sample images of the image density test pattern printed in four primary colors, one for one, can be determined through only a single step, making it possible to reduce the time necessary for determining the image density levels. Further, printing all four sample images of the image density test pattern on a single piece of paper minimizes the number of papers which are going to be wasted.

Some of the preceding embodiments of the present invention were described with reference to an electrophotographic full-color image forming apparatus. This, however, does not means that the application of the present invention is to be limited to an electrophotographic full-color image forming apparatus. In other words, the present invention is applicable to any full-color image forming apparatus regardless of the structure thereof and the image formation method employed thereby.

While the invention has been described with reference to the structures disclosed herein, it is not confined to the details set forth, and this application is intended to cover such modifications or changes as may come within the purposes of the improvements or the scope of the following claims.

What is claimed is:

1. An image density checking chart for checking whether a density of a test image on a sheet outputted by a full-color image forming apparatus is within a predetermined density range or not by an operator, said chart comprising:

an exposing portion configured to expose the test image when the chart is overlaid on the sheet;

a target density image configured to be compared to the test image to determine whether the density of the test image is a target density level or not;

an upper limit density image configured to be compared to the test image to determine whether the density of the test image is not higher than an upper limit density level of the predetermined density range or not; and a lower limit density image configured to be compared to the test image to determine whether the density of the test image is not lower than a lower limit density level of the predetermined density range or not, wherein only said target density image, said upper limit density image and said lower limit density image are disposed around a periphery of said exposing portion, wherein said exposing portion is a general rectangular configuration, and wherein only said target density image, said upper limit density image, and said lower limit density image are disposed at three sides of said exposing portion, wherein said target density image, said upper limit density image, and said lower limit density image have substantially the same size with said exposing portion, and wherein each of said target density image, said upper limit density image and said lower limit density image have one density level.

* * * * *